United States Patent
Schmeichel

(10) Patent No.: US 7,188,887 B1
(45) Date of Patent: Mar. 13, 2007

(54) ROLL TARP SYSTEM

(76) Inventor: Kurt D. Schmeichel, P.O. Box 125, Courtenay, ND (US) 58426

( * ) Notice: Subject to any disclaimer, the term of this patent is extended or adjusted under 35 U.S.C. 154(b) by 0 days.

(21) Appl. No.: 11/155,258

(22) Filed: Jun. 16, 2005

(51) Int. Cl.
*B60P 7/04* (2006.01)

(52) U.S. Cl. .................................. 296/98; 296/100.14

(58) Field of Classification Search ................ 296/98, 296/100.14; 160/69, 70, 78, 79
See application file for complete search history.

(56) References Cited

U.S. PATENT DOCUMENTS

| | | | |
|---|---|---|---|
| 4,505,512 A | 3/1985 | Schmeichel et al. | 296/98 |
| 4,834,445 A * | 5/1989 | Odegaard | 296/98 |
| 5,482,347 A | 1/1996 | Clarys et al. | 296/98 |
| 6,322,041 B1 | 11/2001 | Schmeichel | 248/646 |
| 2003/0052505 A1* | 3/2003 | Searfoss | 296/98 |
| 2003/0151271 A1* | 8/2003 | Leischner et al. | 296/98 |
| 2004/0239142 A1* | 12/2004 | Poyntz | 296/98 |

OTHER PUBLICATIONS www.tarpcentral.com, Bismarck Canvas Company, Website Printout, publication date unknown, 2 Pgs.
www.swstruckbodiesandtrailers.com, Michael's Roll Tarps, Website Printout, publication date unknown, 3 Pgs.
www.agri-covers.com, SRT-2 Spool Roll Tarp, Website Printout, publication date unknown, 9 Pgs.
www.rollrite.com, Tarp Systems, Website Printout, publication date unknown.

* cited by examiner

*Primary Examiner*—Joseph D. Pape

(57) ABSTRACT

A roll tarp system for efficiently covering a heaped load. The roll tarp system includes a tarp attached to a side of a container, a roller attached to the tarp opposite of the container, a rear bracket attached to a rear end of the container, a rear inner arm pivotally attached to the rear bracket, a rear outer arm pivotally attached to the rear inner arm, a front bracket attached to a front end of the container, a front inner arm pivotally attached to the front bracket, a front outer arm pivotally attached to the front inner arm, and an actuator attached to the front inner arm and the roller for rotating the roller. A rear spring and a front spring are attached to the brackets respectively for applying a closing bias force upon the inner arms respectively. A front bias member is attached between the front inner arm and the front outer arm.

15 Claims, 11 Drawing Sheets

ROLL TARP SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to roll tarps for trailers and vehicles, and more specifically it relates to a roll tarp system for efficiently covering a heaped load.

2. Description of the Related Art

Any discussion of the prior art throughout the specification should in no way be considered as an admission that such prior art is widely known or forms part of common general knowledge in the field.

Roll tarps have been in use for years. Typically, a roll tarp is comprised of a tarp attached to the side of a trailer or truck, an elongated roller attached to the tarp opposite of the side of the trailer or truck, and an actuator attached to the elongated roller for rolling the roller in a closed/open position with respect to the container. The actuator may be comprised of a hand crank or an electric motor.

While these devices may be suitable for the particular purpose to which they address, they are not as suitable for efficiently covering a heaped load.

In these respects, the roll tarp system according to the present invention substantially departs from the conventional concepts and designs of the prior art, and in so doing provides an apparatus primarily developed for the purpose of efficiently covering a heaped load.

BRIEF SUMMARY OF THE INVENTION

In view of the foregoing disadvantages inherent in the known types of roll tarps now present in the prior art, the present invention provides a new roll tarp system construction wherein the same can be utilized for efficiently covering a heaped load.

The general purpose of the present invention, which will be described subsequently in greater detail, is to provide a new roll tarp system that has many of the advantages of the roll tarps mentioned heretofore and many novel features that result in a new roll tarp system which is not anticipated, rendered obvious, suggested, or even implied by any of the prior art roll tarps, either alone or in any combination thereof.

To attain this, the present invention generally comprises a tarp attached to a side of a container, a roller attached to the tarp opposite of the container, a rear bracket attached to a rear end of the container, a rear inner arm pivotally attached to the rear bracket, a rear outer arm pivotally attached to the rear inner arm, a front bracket attached to a front end of the container, a front inner arm pivotally attached to the front bracket, a front outer arm pivotally attached to the front inner arm, and an actuator attached to the front inner arm and the roller for rotating the roller. A rear spring and a front spring are attached to the brackets respectively for applying a closing bias force upon the inner arms respectively. A front bias member is attached between the front inner arm and the front outer arm.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a roll tarp system that will overcome the shortcomings of the prior art devices.

A second object is to provide a roll tarp system for efficiently covering a heaped load.

Another object is to provide a roll tarp system that does not require elastic cords for closing a roll cover.

An additional object is to provide a roll tarp system that may be utilized upon various types of trucks and trailers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
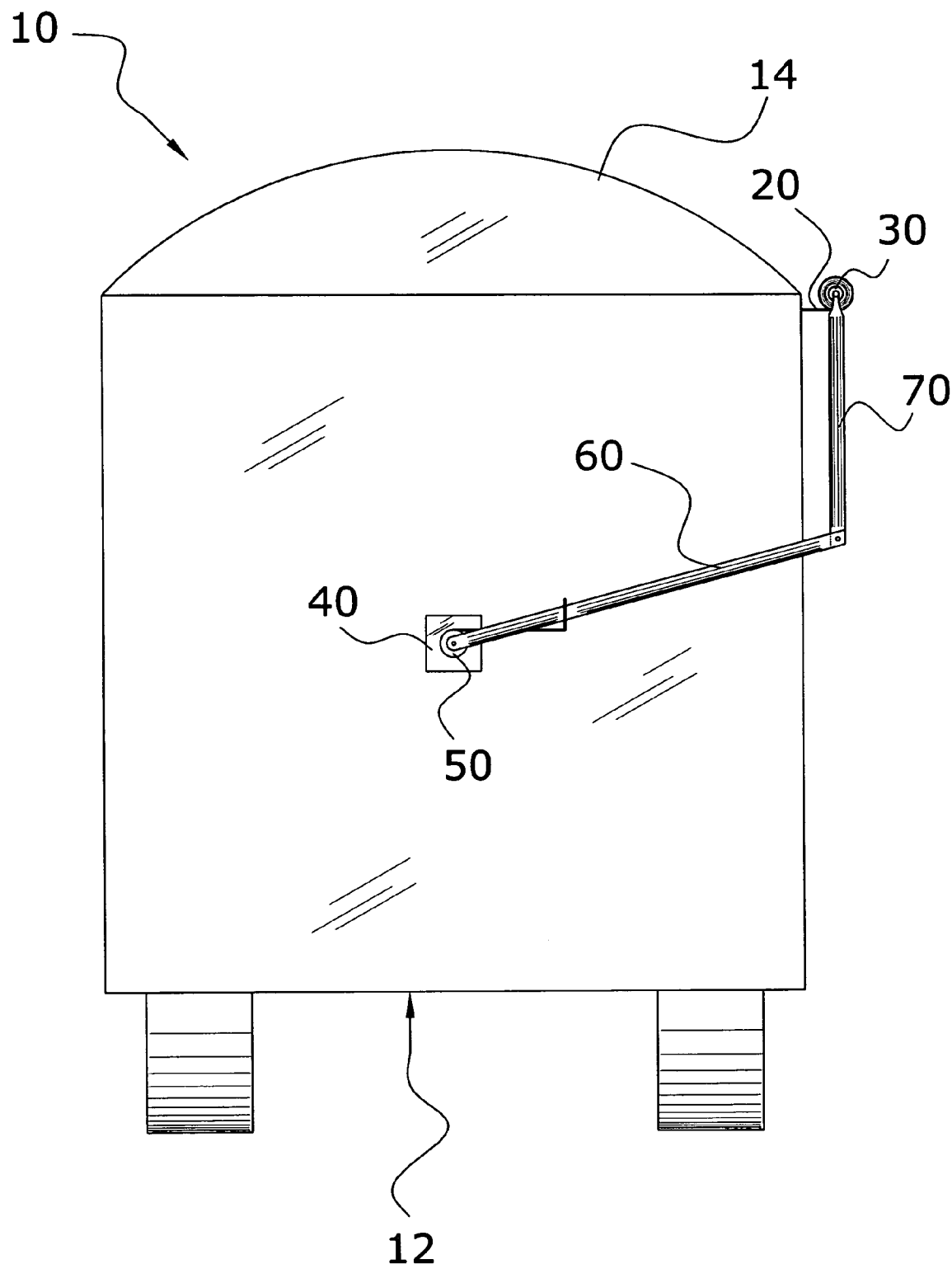
FIG. 1 is rear view of the present invention attached to a container in the open position.

Turning now descriptively to the drawings, in which similar reference characters denote similar elements throughout the several views, FIGS. 1 through 7e illustrate a roll tarp system 10, which comprises a tarp 20 attached to a side of a container 12, a roller 30 attached to the tarp 20 opposite of the container 12, a rear bracket 40 attached to a rear end of the container 12, a rear inner arm 60 pivotally attached to the rear bracket 40, a rear outer arm 70 pivotally attached to the rear inner arm 60, a front bracket 42 attached to a front end of the container 12, a front inner arm 62 pivotally attached to the front bracket 42, a front outer arm 72 pivotally attached to the front inner arm 62, and an actuator 32 attached to the front inner arm 62 and the roller 30 for rotating the roller 30. A rear spring 50 and a front spring 52 are attached to the brackets respectively for applying a closing bias force upon the inner arms respectively. A front bias member 74 is attached between the front inner arm 62 and the front outer arm 72.

B. Tarp

The tarp 20 may be comprised of any well-known tarp 20 structure commonly utilized to cover various types of containers 12 such as trailers, boxes of trucks and the like. One end of the tarp 20 is attached to a side of the container 12 as best illustrated in FIG. 1 of the drawings. The tarp 20 may be attached to the container 12 via various fastener structures as can be appreciated by one skilled in the art.

C. Roller

Figure 2:
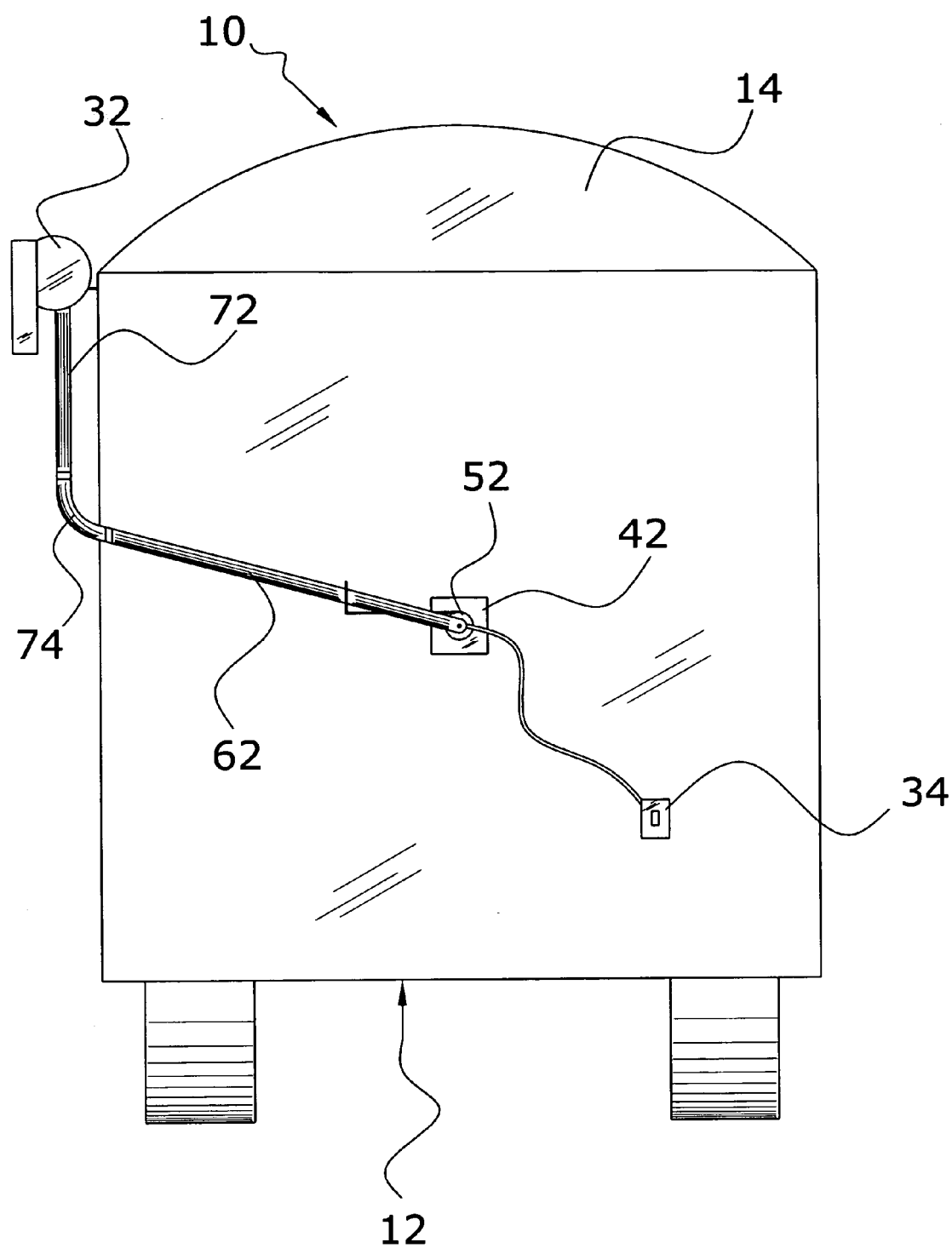
FIG. 2 is a front view of the present invention attached to a container in the open position.
Figure 3:
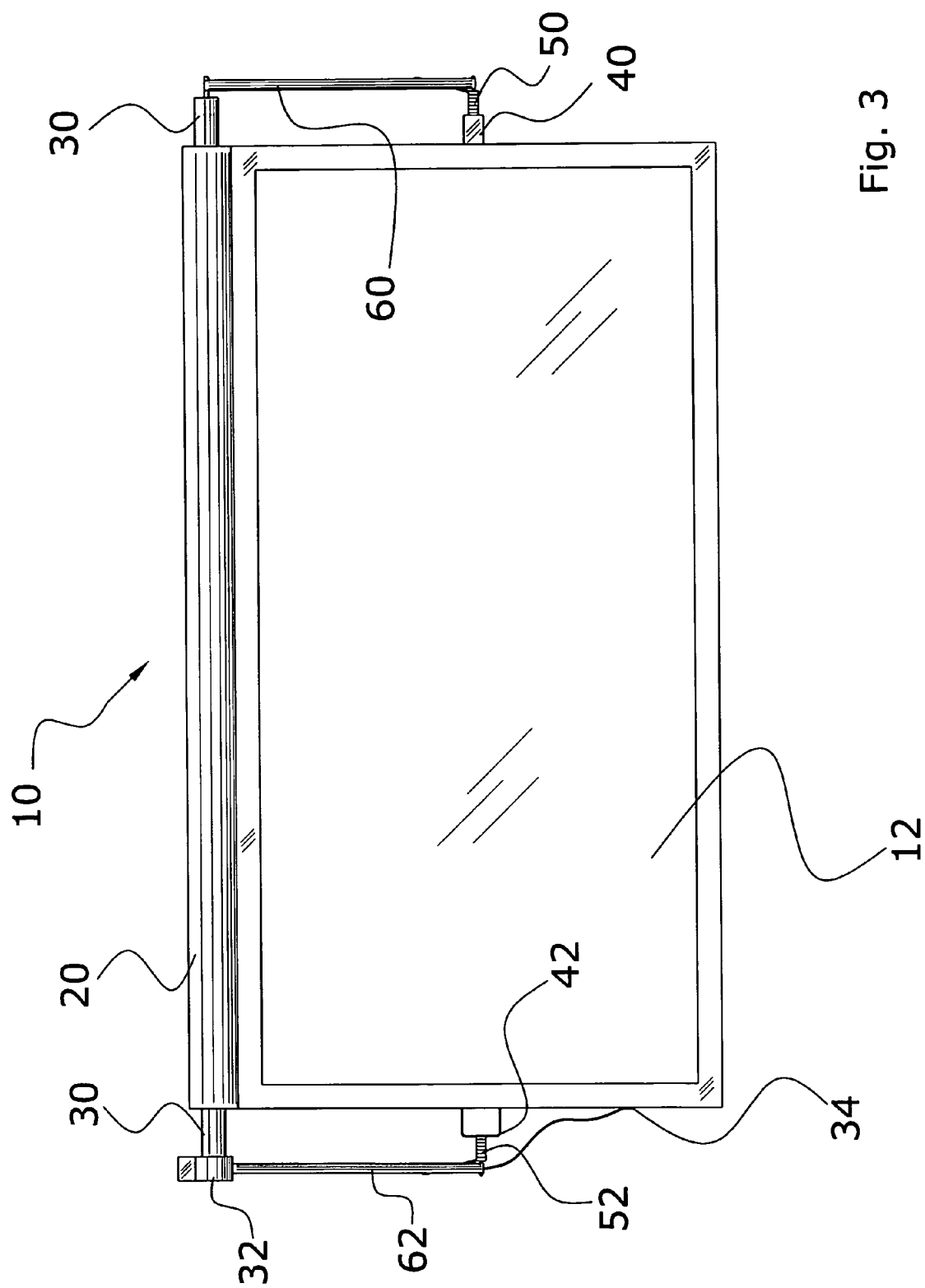
FIG. 3 is a top view of the present invention attached to a container.
Figure 4:
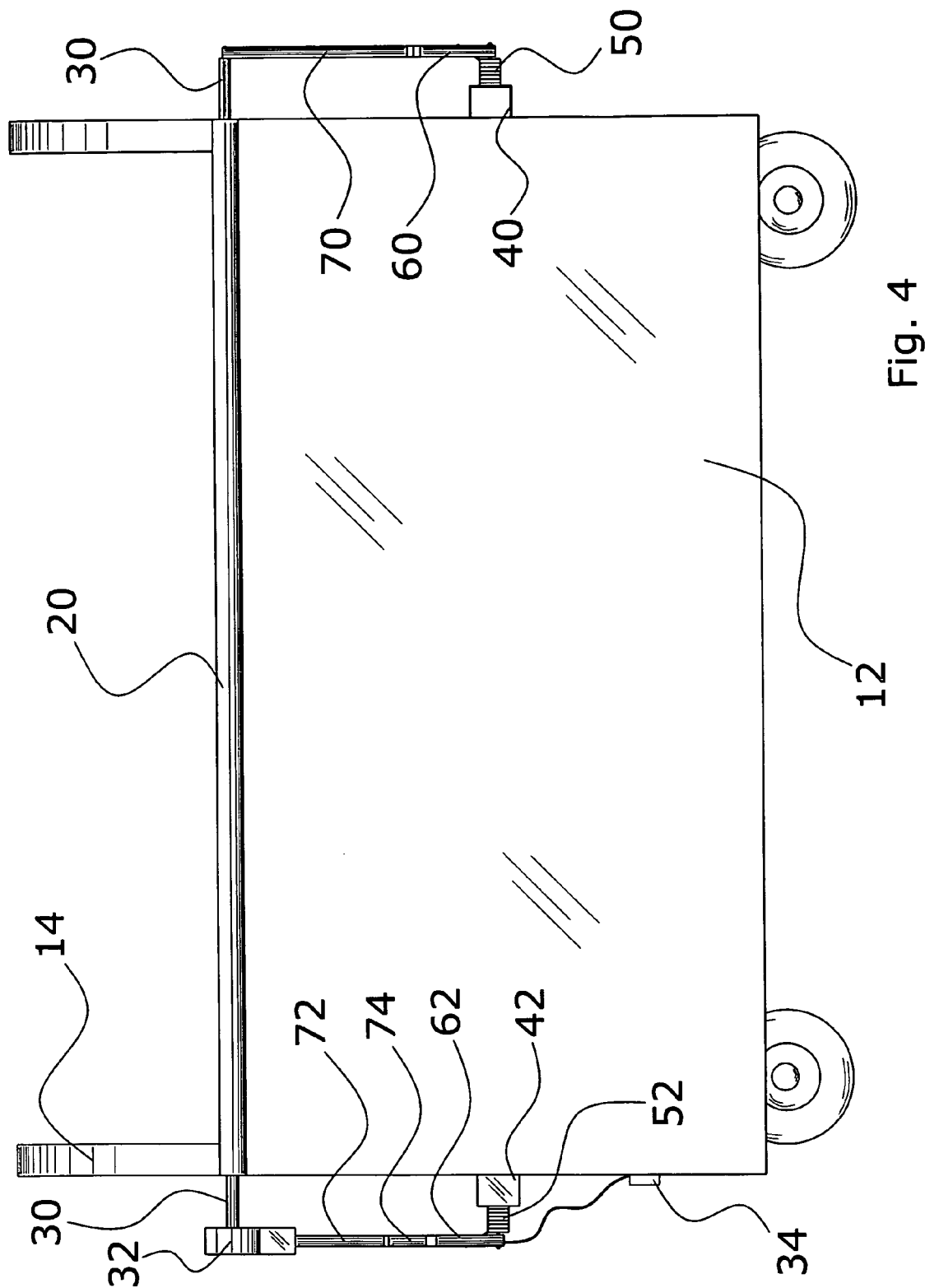
FIG. 4 is a side view of the present invention attached to a container.
Figure 5:
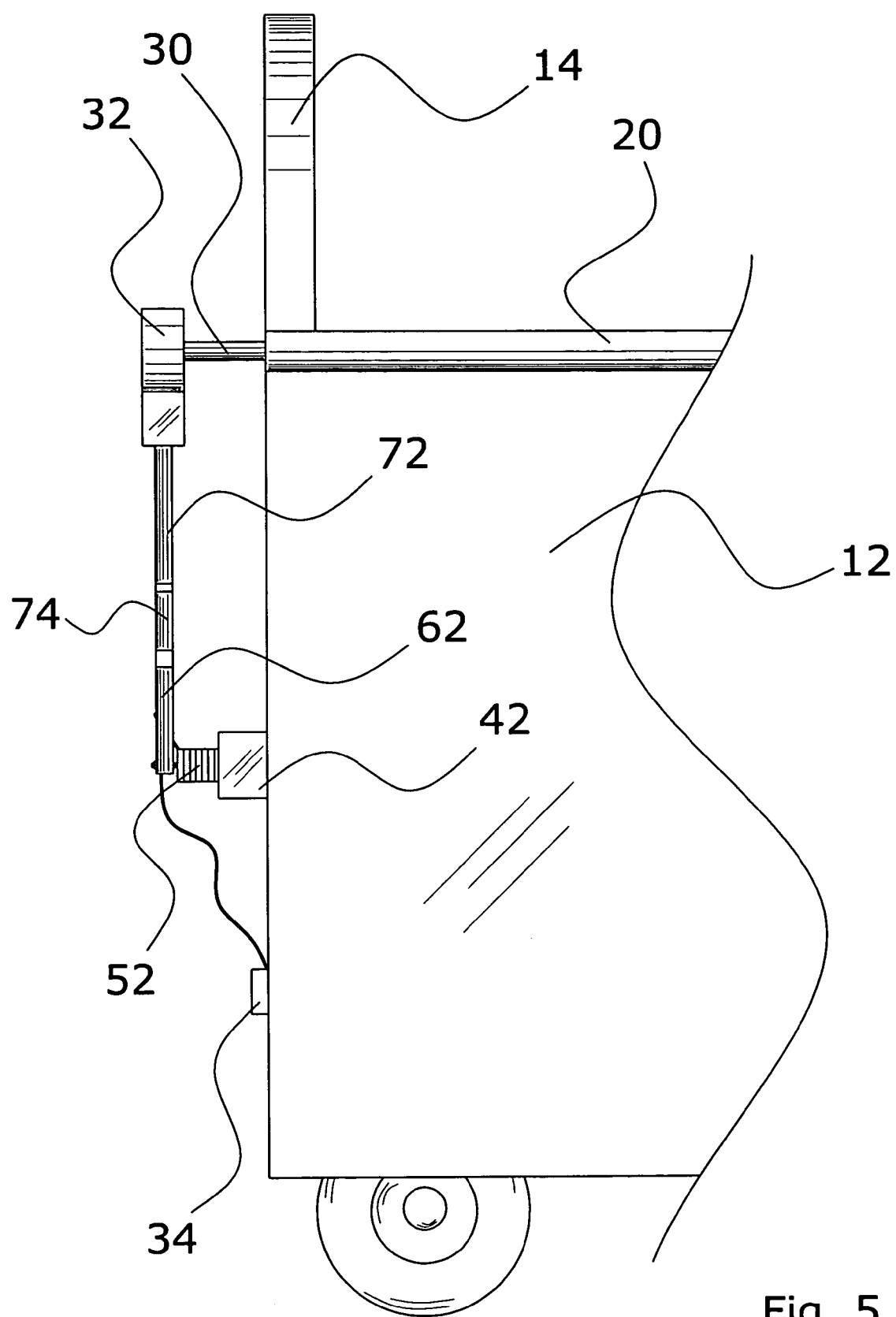
FIG. 5 is a magnified side view of the front inner arm and front outer arm with respect to the container.
Figure 6:
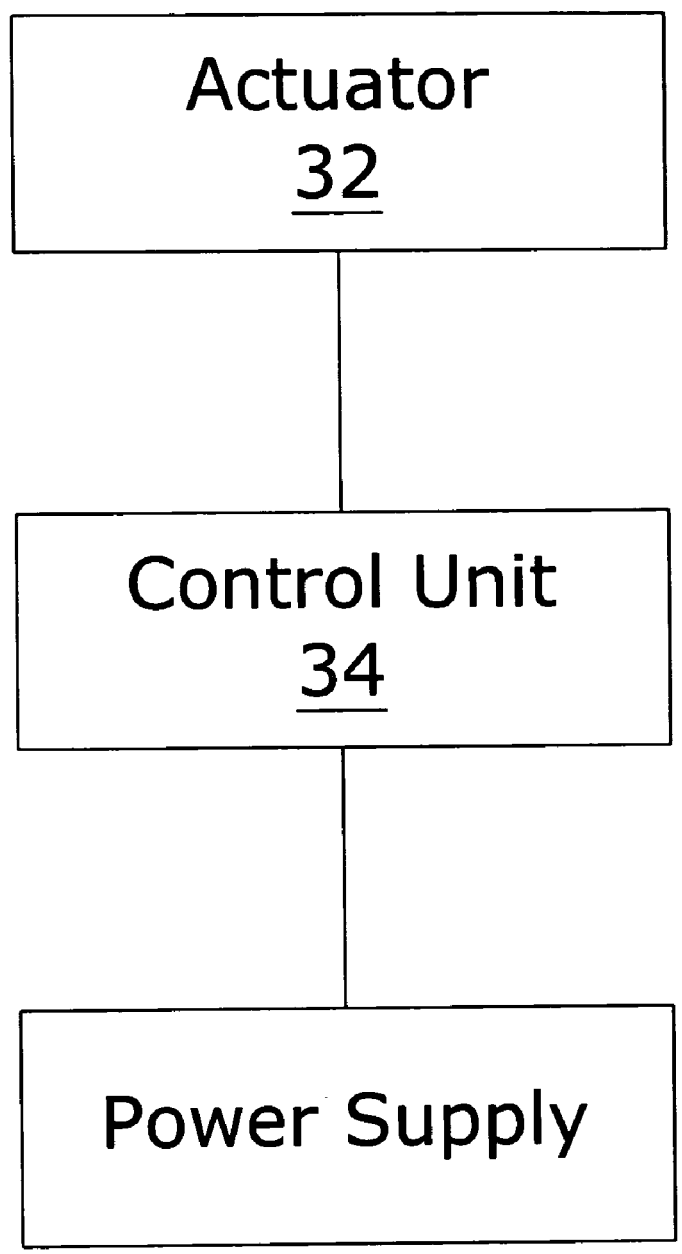
FIG. 6 is a block diagram illustrating the electrical connections of the present invention.

The roller 30 is attached to the tarp 20 opposite of the container 12 as further illustrated in FIGS. 1 and 2 of the drawings. The roller 30 is comprised of an elongated structure capable of extending the entire distance of the container 12 being covered as shown in FIGS. 3 and 4 of the drawings. The roller 30 may be comprised of a solid or tubular structure.

The roller 30 preferably extends past the upper end 14 of the container 12 as best illustrated in FIG. 3 of the drawings. The width of the tarp 20 is preferably less than the length of the roller 30 as further illustrated in FIGS. 3 and 4 of the drawings.

D. Rear Support Structure

As shown in FIGS. 1, 3 and 4 of the drawings, a rear bracket 40 is attached to a rear end of the container 12. The rear bracket 40 may be comprised of various structures that extend outwardly from the container 12.

A rear inner arm 60 is pivotally attached to the rear bracket 40 as further shown in shown in FIGS. 1, 3 and 4 of the drawings. The rear inner arm 60 may be comprised of various elongated structures. A rear outer arm 70 is pivotally attached to the rear inner arm 60 as illustrated in FIG. 1 of the drawings. The rear outer arm 70 may be pivotally attached to the rear inner arm 60 with various types of hinge structures. The rear outer arm 70 may be biased or it may not be biased.

As shown in FIGS. 1, 3 and 4 of the drawings, a rear spring 50 is attached to the rear bracket 40 and the rear inner arm 60 for applying a closing bias force upon the rear inner arm 60. The rear spring 50 is preferably comprised of a torsion spring having an extended arm that engages a portion of the rear inner arm 60 for applying the closing bias force.

E. Front Support Structure

As shown in FIGS. 2, 3, 4, 5 and 7a through 7d of the drawings, a front bracket 42 is attached to a front end of the container 12. The front bracket 42 may be comprised of various structures that extend outwardly from the container 12.

A front inner arm 62 is pivotally attached to the front bracket 42 as further shown in shown in FIGS. 2, 3, 4, 5 and 7a through 7d of the drawings. The front inner arm 62 may be comprised of various elongated structures similar to the rear inner arm 60. A front outer arm 72 is pivotally attached to the front inner arm 62 as illustrated in FIG. 1 of the drawings.

Figure 7A:
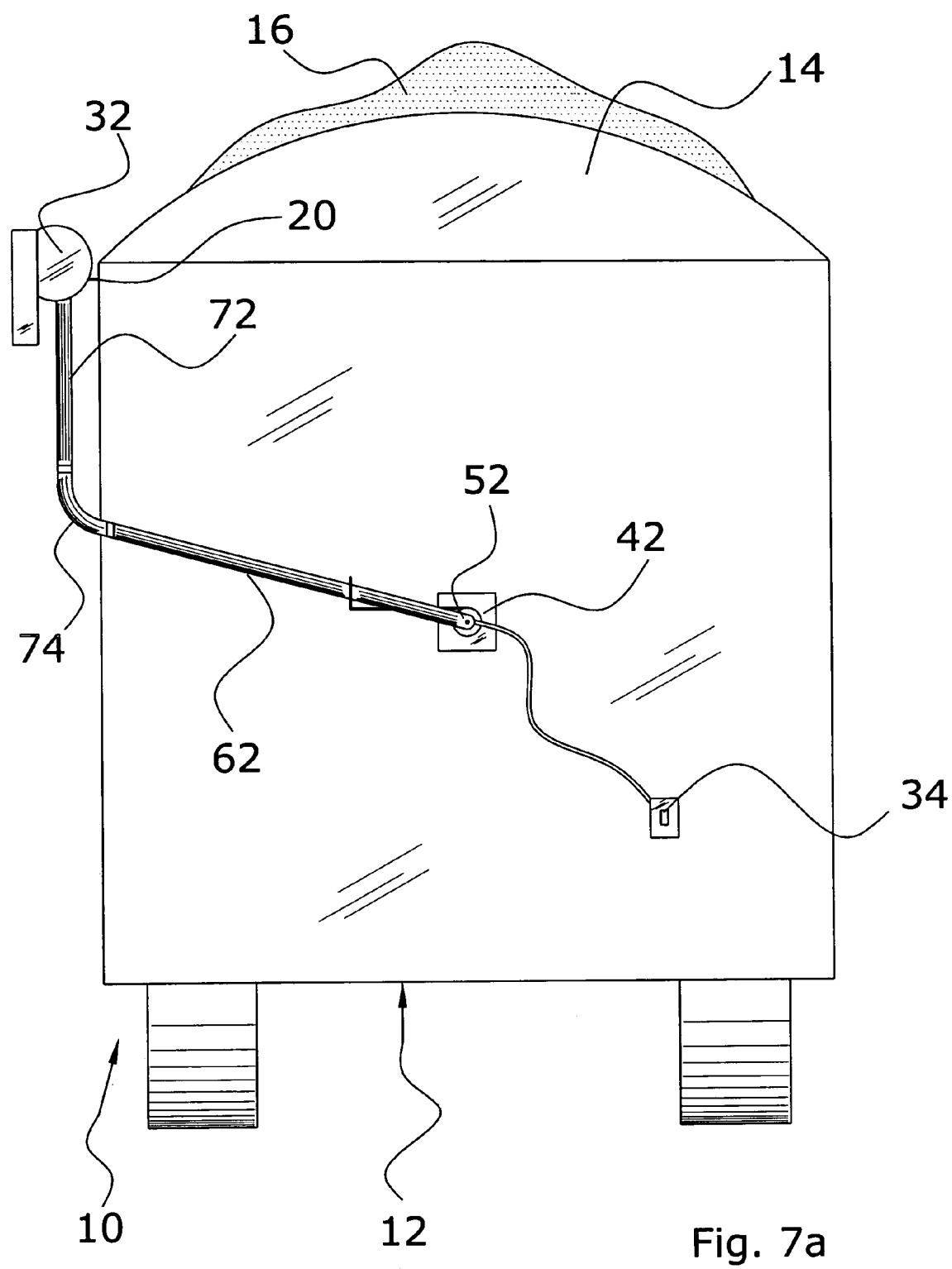
FIG. 7a is a front view of the present invention attached to a container with a heaped load with the tarp in the open position.

A front bias member 74 is preferably attached between the front inner arm 62 and the front outer arm 72. The front bias member 74 is preferably comprised of a flexible tube (e.g. rubber tube) surrounding a compression spring. Alternatively, the front bias member 74 is comprised of a compression spring without a cover. The front bias member 74 is preferably concentrically attached between the front inner arm 62 and the front outer arm 72 as best illustrated in FIG. 7c of the drawings. The front bias member 74 is flexible while attempting to retain the front inner arm 62 and the front outer arm 72 in a concentrically aligned position.

As shown in FIGS. 2 through 4 of the drawings, a front spring 52 is attached to the front bracket 42 and the front inner arm 62 for applying a closing bias force upon the front inner arm 62. The front spring 52 is preferably comprised of a torsion spring having an extended arm that engages a portion of the front inner arm 62 for applying the closing bias force.

F. Actuator

The actuator 32 is attached to the front outer arm 72 and the roller 30 for rotating the roller 30 as shown in FIGS. 2 through 5 of the drawings. The actuator 32 may be comprised of a hand crank or an electric motor which are well known in the art of roll covers.

If an electric motor is used to construct the actuator 32, a control unit 34 is preferably in communication with the actuator 32 for controlling the rotation of the roller 30. The control unit 34 may be comprised of a simple switch or other controller 30 device. The control unit 34 is electrically connected to any type of conventional power supply (e.g. battery, vehicle electrical system). The control unit 34 is preferably electrical connected to the actuator 32 for controlling and providing electrical power to the actuator 32.

G. Operation of Invention

In use, the present invention is first attached to a conventional container 12 (e.g. trailer, box of a truck, etc.) in various manners that are understood by one skilled in the art. After the present invention is installed upon the container 12, the container 12 is then filled with a load 16 (e.g. grain, gravel, etc.) as shown in FIG. 7a. As often occurs, the load 16 extends above the upper end 14 of the container 12 as further shown in FIG. 7a where the benefits of the present invention are best illustrated.

Figure 7B:
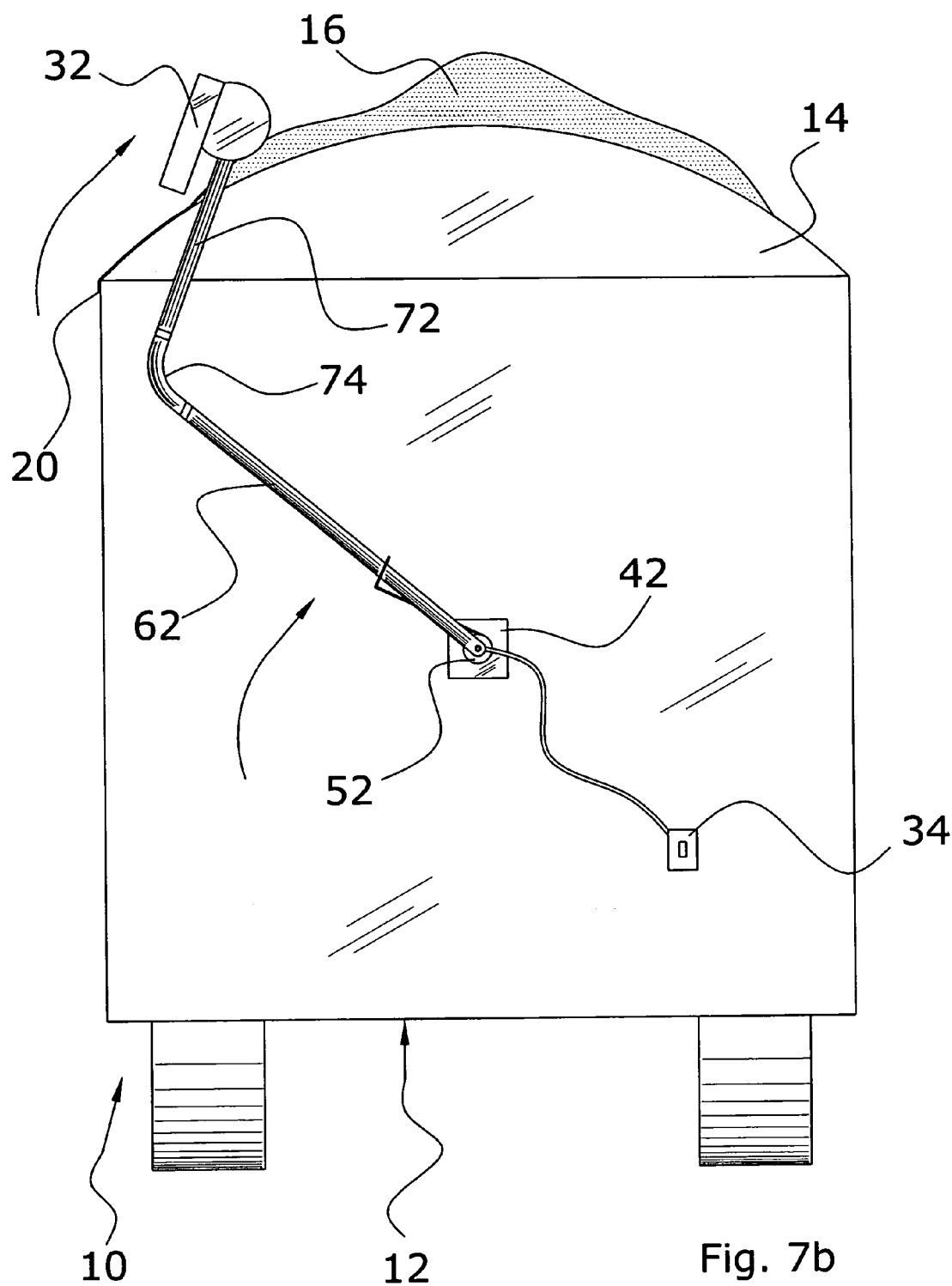
FIG. 7b is a front view of the present invention attached to a container with a heaped load with the tarp in the partially open position.
Figure 7C:
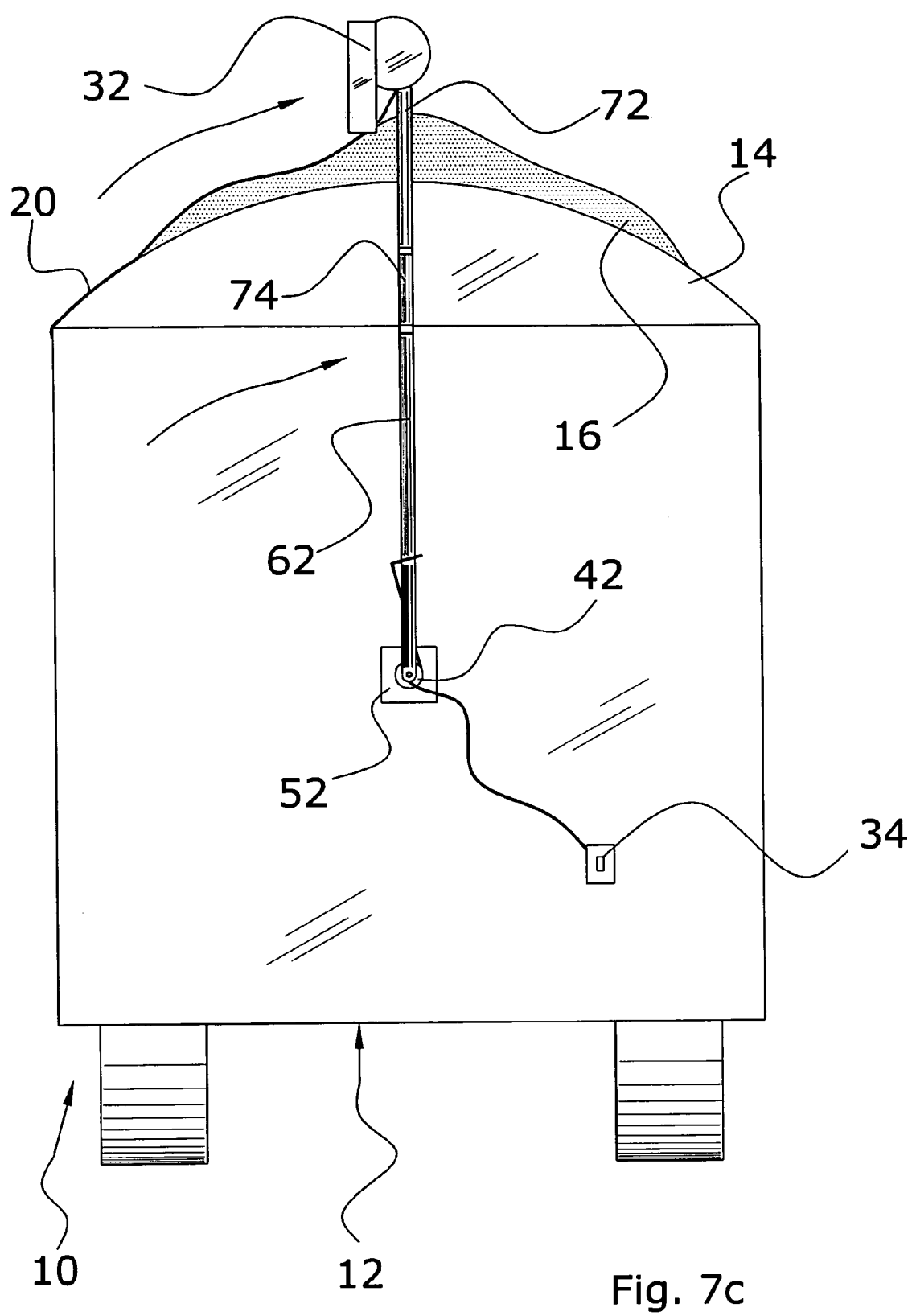
FIG. 7c is a front view of the present invention attached to a container with a heaped load with the tarp approximately half ways to being in the closed position.
Figure 7D:
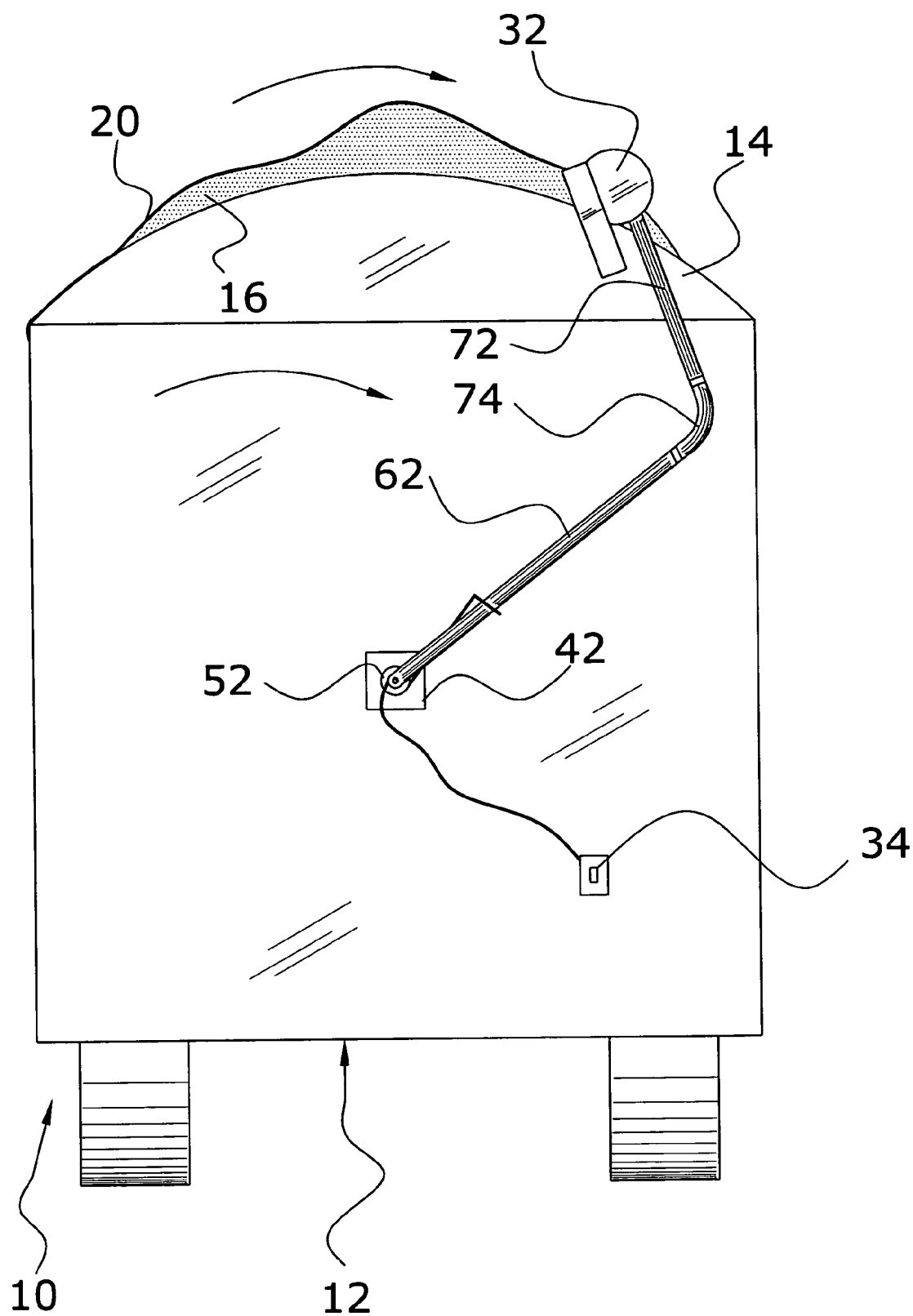
FIG. 7d is a front view of the present invention attached to a container with a heaped load with the tarp approaching the closed position.

To close the tarp 20 upon the container 12 and the load 16, the control unit 34 is manipulated thereby activating the actuator 32 to roll the roller 30 in a first rotation as shown in FIG. 7b. Alternatively, if a hand crank is utilized for the actuator 32 the user would simply manipulate the actuator 32 manually as is well known in the art. As the roller 30 is rotated in the first direction, roller 30 rolls along the upper edge of the container 12 in a closing direction. The springs 50, 52 apply the closing bias force to the inner arms 60, 62 to also facilitate the closing movement of the roller 30 as shown in FIG. 7b of the drawings. The rotation of the roller 30 in the first rotation causes the release of the tarp 20 from the roller 30 which allows the roller 30 to move towards the closed position as encouraged by the springs 50, 52 and the front bias member 74.

Figure 7E:
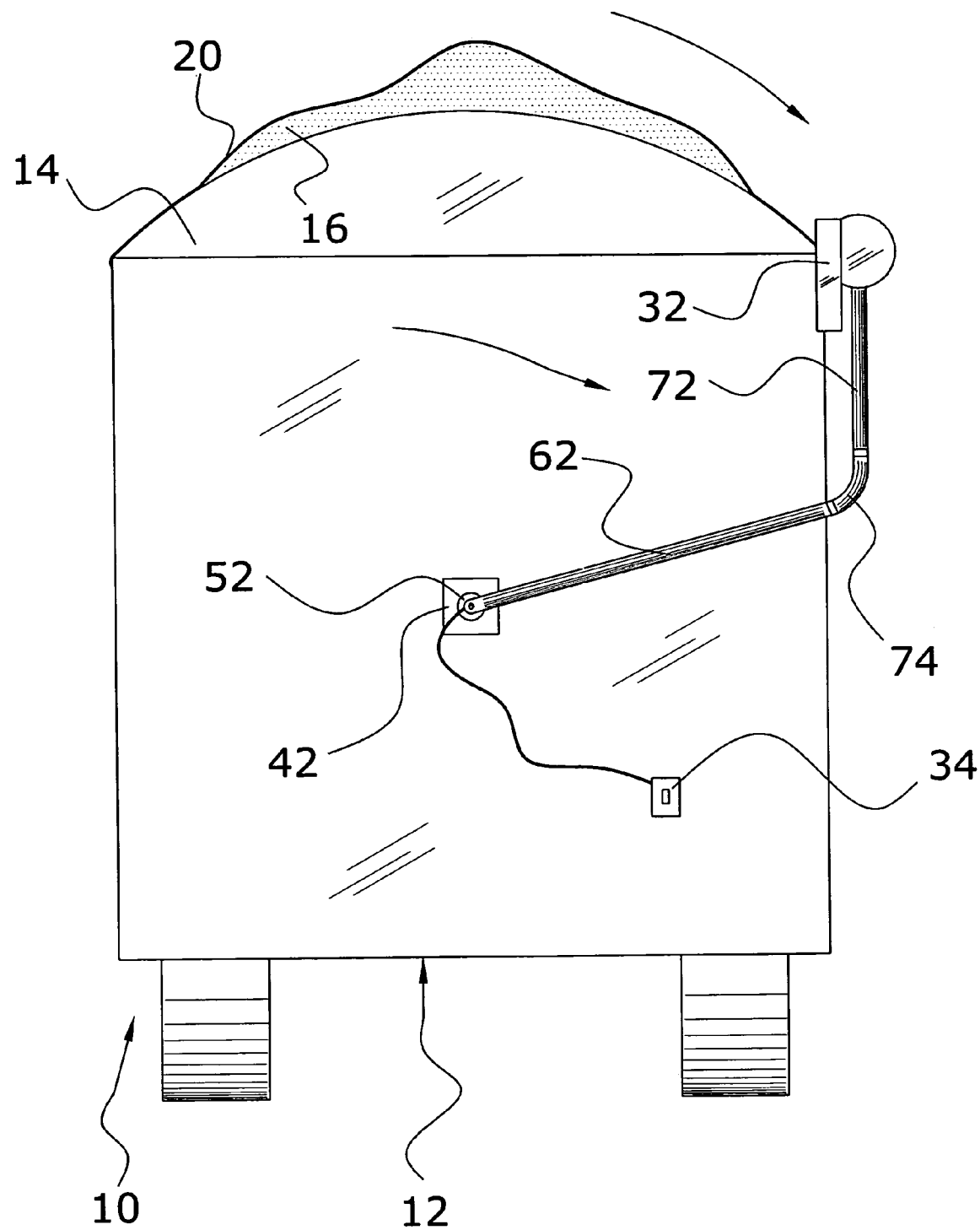
FIG. 7e is a front view of the present invention attached to a container with a heaped load with the tarp in the closed position.

As the roller 30 moves in the closing direction, the front bias member 74 applies an extending force to the front outer arm 72 thereby encouraging the front outer arm 72 to extend to have less of an angle with respect to the front inner arm 62. The extending force applied by the front bias member 74 causes the straightening of the front outer arm 72 which in effect elevates the roller 30 above the load 16 as shown in FIGS. 7b and 7c of the drawings. As the actuator 32 continues to rotate the roller 30 in the closing position until the roller 30 is fully extended as shown in FIG. 7e of the drawings. When the roller 30 is in the closed position, the front bias member 74 is bent in a direction opposite of the initial open position as shown in FIG. 7e of the drawings. The user is then able to transport the load 16 to a desired location as required.

To open the container, the above-stated process is simply reversed wherein the actuator causes the tarp to be wound upon the roller which causes the roller to move in an opening direction.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A roll tarp system, comprising:
   a tarp attached to a side of a container;
   a roller attached to said tarp opposite of said container;
   a rear bracket attached to a rear end of said container;
   a rear inner arm pivotally attached to said rear bracket;
   a rear outer arm pivotally attached to said rear inner arm;
   a front bracket attached to a front end of said container;
   a front inner arm pivotally attached to said front bracket;
   a front outer arm pivotally attached to said front inner arm;
   an actuator attached to said front outer arm and said roller for rotating said roller; and
   a front bias member attached between said front inner arm and said front outer arm;
   wherein said front bias member is flexible to allow said front inner arm to laterally pivot with respect to said front outer arm, and wherein said front bias member applies a force between said front inner arm and said front outer arm attempting to retain said front inner arm and said front outer arm in a concentrically aligned position;
   wherein said front bias member is comprised of a flexible tube surrounding a compression spring.

2. The roll tarp system of claim 1, including a rear spring and a front spring attached to said rear bracket and said front bracket respectively for applying a closing bias force upon said inner arms respectively.

3. The roll tarp system of claim 2, wherein said rear spring and said front spring are comprised of torsion springs.

4. The roll tarp system of claim 3, wherein said rear spring and said front spring each include an extended arm that engages a portion of said rear inner arm and said front inner arm respectively for applying said closing bias force.

5. The roll tarp system of claim 1, wherein said actuator is comprised of a hand crank.

6. The roll tarp system of claim 1, wherein said actuator is comprised of an electric motor.

7. The roll tarp system of claim 6, including a control unit in communication with said actuator for controlling the rotation of said roller.

8. A roll tarp system, comprising:
   a tarp;
   a roller attached to said tarp;
   a rear bracket;
   a rear inner arm pivotally attached to said rear bracket;
   a rear outer arm pivotally attached to said rear inner arm;
   a front bracket;
   a front inner arm pivotally attached to said front bracket;
   a front outer arm pivotally attached to said front inner arm;
   an actuator attached to said front outer arm and said roller for rotating said roller; and
   a front bias member attached between said front inner arm and said front outer arm;
   wherein said front bias member is flexible to allow said front inner arm to laterally pivot with respect to said front outer arm and wherein said front bias member applies a force between said front inner arm and said front outer arm attempting to retain said front inner arm and said front outer arm in a concentrically aligned position;
   wherein said front bias member is comprised of a flexible tube surrounding a compression spring.

9. The roll tarp system of claim 8, including a rear spring and a front spring attached to said rear bracket and said front bracket respectively for applying a closing bias force upon said inner arms respectively.

10. The roll tarp system of claim 9, wherein said rear spring and said front spring are comprised of torsion springs.

11. The roll tarp system of claim 10, wherein said rear spring and said front spring each include an extended arm that engages a portion of said rear inner arm and said front inner arm respectively for applying said closing bias force.

12. The roll tarp system of claim 8, wherein said actuator is comprised of a hand crank.

13. The roll tarp system of claim 8, wherein said actuator is comprised of an electric motor.

14. The roll tarp system of claim 13, including a control unit in communication with said actuator for controlling the rotation of said roller.

15. A roll tarp system, comprising:
   a tarp attached to a side of a container;
   a roller attached to said tarp opposite of said container;
   a rear bracket attached to a rear end of said container;
   a rear inner arm pivotally attached to said rear bracket;
   a rear outer arm pivotally attached to said rear inner arm;
   a front bracket attached to a front end of said container;
   a front inner arm pivotally attached to said front bracket;

a front outer arm pivotally attached to said front inner arm;

an actuator attached to said front outer arm and said roller for rotating said roller;

a front bias member attached between said front inner arm and said front outer arm;

wherein said front bias member is flexible to allow said front inner arm to laterally pivot with respect to said front outer arm, and wherein said front bias member applies a force between said front inner arm and said front outer arm attempting to retain said front inner arm and said front outer arm in a concentrically aligned position;

wherein said front bias member is comprised of a flexible tube surrounding a compression spring;

a rear spring and a front spring attached to said rear bracket and said front bracket respectively for applying a closing bias force upon said inner arms respectively;

wherein said rear spring and said front spring are comprised of torsion springs;

wherein said rear spring and said front spring each include an extended arm that engages a portion of said rear inner arm and said front inner arm respectively for applying said closing bias force;

wherein said actuator is comprised of an electric motor; and a control unit in communication with said actuator for controlling the rotation of said roller.

* * * * *